(12) United States Patent
Weiermair

(10) Patent No.: US 12,072,712 B2
(45) Date of Patent: Aug. 27, 2024

(54) SYSTEM AND METHOD OF CONTROLLING THE MOVEMENT OF A MOBILE MINING MACHINE

(71) Applicant: SANDVIK MINING AND CONSTRUCTION G.M.B.H., Zeltweg (AT)

(72) Inventor: Guenther Weiermair, Zeltweg (AT)

(73) Assignee: Sandvik Mining and Construction G.m.b.H., Zeltweg (AT)

( * ) Notice: Subject to any disclaimer, the term of this patent is extended or adjusted under 35 U.S.C. 154(b) by 856 days.

(21) Appl. No.: 17/048,675

(22) PCT Filed: Apr. 20, 2018

(86) PCT No.: PCT/EP2018/060252
§ 371 (c)(1),
(2) Date: Oct. 19, 2020

(87) PCT Pub. No.: WO2019/201455
PCT Pub. Date: Oct. 24, 2019

(65) Prior Publication Data
US 2021/0373568 A1 Dec. 2, 2021

(51) Int. Cl.
*B62D 11/02* (2006.01)
*B62D 7/02* (2006.01)
(Continued)

(52) U.S. Cl.
CPC ........... *G05D 1/0236* (2013.01); *B62D 7/026* (2013.01); *B62D 7/1509* (2013.01); *B62D 11/02* (2013.01);
(Continued)

(58) Field of Classification Search
CPC ...... G05D 1/02; G05D 1/0255; G05D 1/0236; G05D 2201/021; E21F 13/02;
(Continued)

(56) References Cited

U.S. PATENT DOCUMENTS 4,699,239 A * 10/1987 Ishino .................... B60W 10/11
180/6.7
7,942,604 B2 5/2011 Willis et al.
(Continued)

FOREIGN PATENT DOCUMENTS

CN 102167081 A 8/2011
CN 104663027 A 6/2015
(Continued)

OTHER PUBLICATIONS

An abstract of "Leader cable guidance of an experimental field gantry" by IN.D. Tillett and T.G. Nybrant; from Journal of Agricultural Engineering Research; vol. 45, Jan.-Apr. 1990, pp. 253-267 (Year: 1990).*
(Continued)

*Primary Examiner* — Cuong H Nguyen
(74) *Attorney, Agent, or Firm* — Corinne R. Gorski

(57) ABSTRACT

The present disclosure relates to a system and a method of controlling the movement of a tracked mobile mining machine having one or more articulated vehicle units. The control system works by taking input from manual or automated input means, the input serving as a set operating value for at least one driving parameter. The controller generates control signals, which are sent to regulating means that actuate the motor of the mobile mining machine. Using sensors on the machine, actual values of the driving parameter are measured in real-time and fed to the controller for comparison with the original set values. Any difference in the values is compensated for when the controller sends control signals to the regulating means causing readjustment of the driving parameter of the mining machine. The control system is applicable to crawler-driven powered vehicle units to ensure synchronous crawler movement for both linear and non-linear paths.

15 Claims, 15 Drawing Sheets

(51) Int. Cl.
*B62D 7/15* (2006.01)
*B62D 11/20* (2006.01)
*E21F 13/02* (2006.01)
*G05D 1/00* (2006.01)

(52) U.S. Cl.
CPC .............. *B62D 11/20* (2013.01); *E21F 13/02* (2013.01); *G05D 1/0255* (2013.01)

(58) Field of Classification Search
CPC ........ B62D 11/18; B62D 11/20; B62D 12/00; B62D 7/026; B62D 7/1509
USPC .................................................... 91/508, 511
See application file for complete search history.

(56) References Cited

U.S. PATENT DOCUMENTS

| | | | |
|---|---|---|---|
| 9,310,805 B2 | 4/2016 | Muller et al. | |
| 9,616,949 B2 | 4/2017 | Hellholm et al. | |
| 2002/0153188 A1* | 10/2002 | Brandt | E02F 9/2004 180/234 |
| 2010/0021234 A1* | 1/2010 | Willis | E01C 23/088 417/399 |
| 2012/0083961 A1* | 4/2012 | Sato | G05D 1/0265 701/25 |
| 2015/0094913 A1* | 4/2015 | Muller | B62D 6/00 701/41 |
| 2018/0268695 A1* | 9/2018 | Agnew | B60K 28/06 |
| 2019/0382005 A1* | 12/2019 | Nishi | G01S 15/931 |

FOREIGN PATENT DOCUMENTS

| | | | | |
|---|---|---|---|---|
| CN | 107310643 A | * | 11/2017 | ............ B62D 55/08 |
| DE | 202005015825 U1 | | 12/2005 | |
| DE | 202005015825 U1 | * | 2/2006 | ........... B62D 11/003 |

OTHER PUBLICATIONS

An abstract of "Image-based particle filtering for navigation in a semi-structured agricultural environment" 2014, Biosystems Engineering (Year: 2014).*

"Automatic Guidance of a Tractor in a Vineyard" by O. Yekutieli et al; Published by the American Society of Agricultural and Biological Engineers, St. Joseph, Michigan www.asabe.org Citation: pp. 252-260 in Automation Technology for Off-Road Equipment, Proceedings of the Jul. 26-27, 2002 Conference (Year: 2002).*

"Development and Control of Mine Detection Robot COMET-II and COMET-III" by Kenzo Nonami et al; p. 881-890 (DOI https://doi.org/10.1299/jsmec.46.881 ) (Year: 2003).*

Development of an Attitude Adjustment Crawler Chassis for Combine Harvester and Experiment of Adaptive Leveling System by Jinpeng Hu et al, Agronomy 2022, 12(3), 717; https://doi.org/10.3390/agronomy12030717 (Year: 2022).*

Xu, Zefeng, et al. "Modular Soft Robotic Crawlers Based on Fluidic Prestressed Composite Actuators." Journal of Bionic Engineering (2024): 1-13.(Year: 2024).*

* cited by examiner

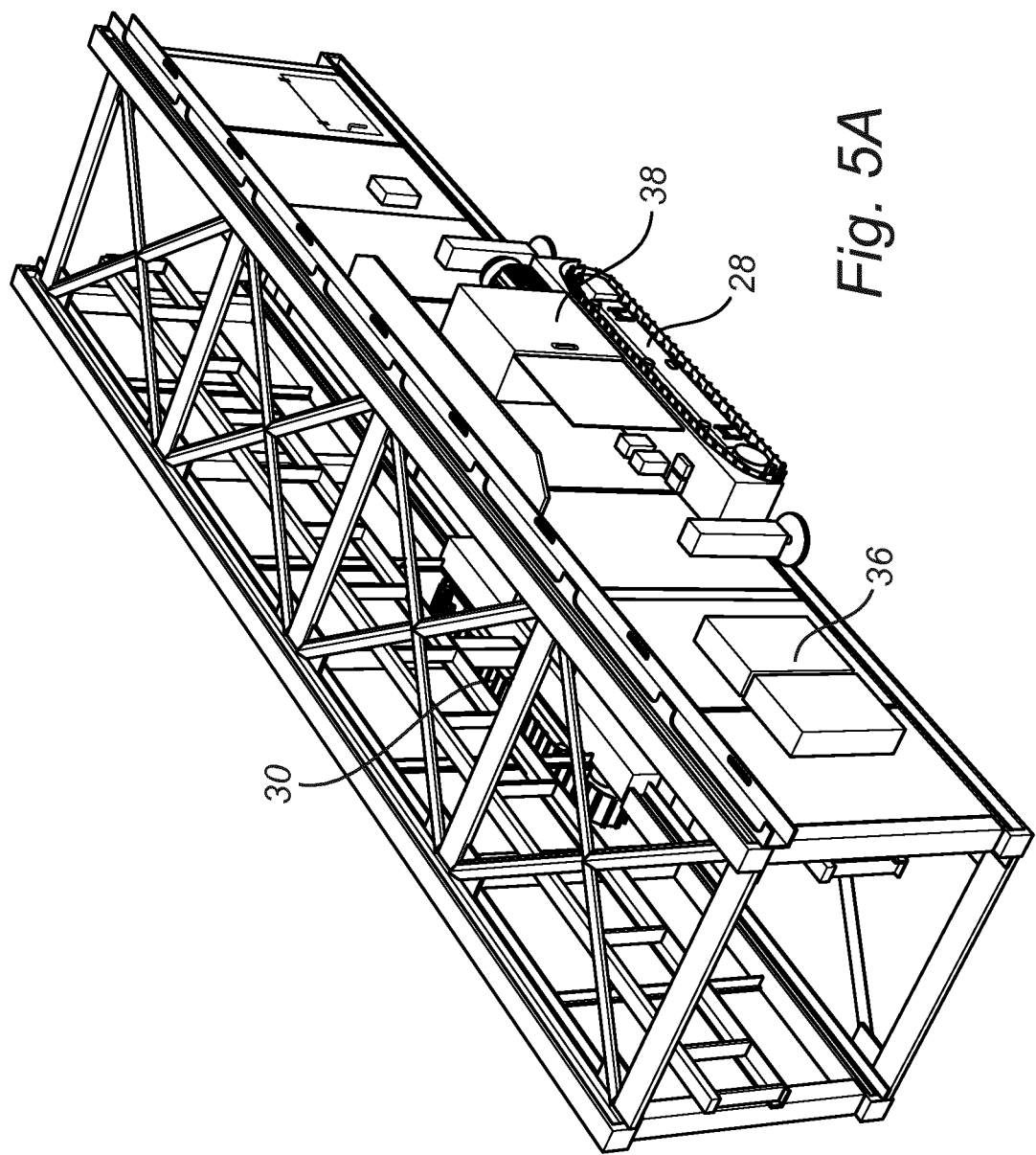

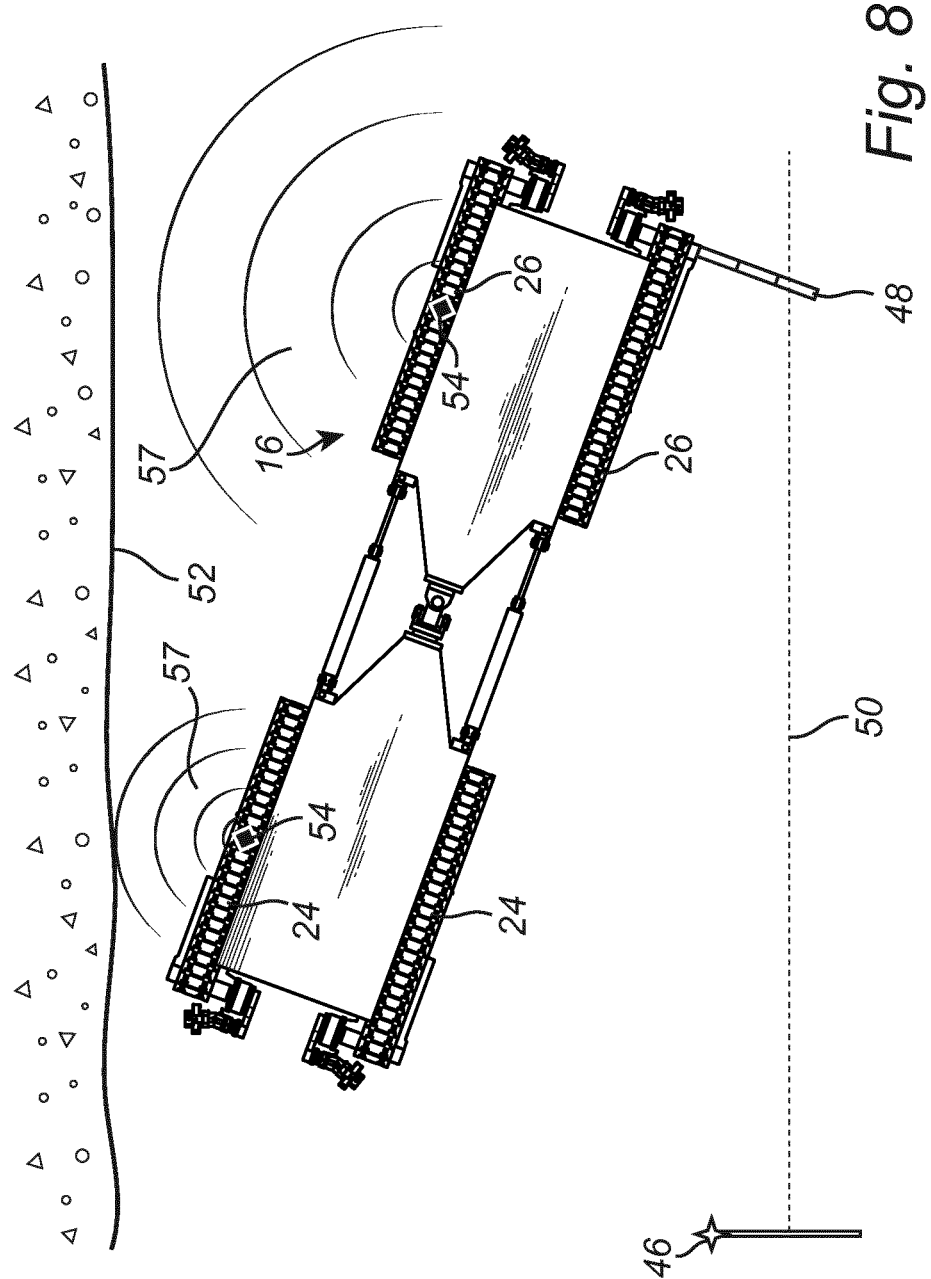

SYSTEM AND METHOD OF CONTROLLING THE MOVEMENT OF A MOBILE MINING MACHINE

RELATED APPLICATION DATA

This application is a § 371 National Stage Application of PCT International Application No. PCT/EP2018/060252 filed Apr. 20, 2018.

FIELD OF INVENTION

The present disclosure relates to system and method of controlling tracked vehicles. More particularly, it relates to a system and method of controlling the movement of a mobile mining machine having one or more sequentially articulated vehicle units specially for continuous haulage in underground mining operations.

BACKGROUND

In the field of underground mining, especially for coal mining operations, the machine employed for cutting or breaking coal operates continuously. For this operation, it is important that means are available to continuously haul the loosened material away from the mining site. Such means are known as continuous haulage systems which are connected to the cutting machine, and comprise a series of conveyors and carriers pivotally linked together. Presently used continuous haulage systems which form a part of large mobile mining machines comprise self-propelled tracked mobile conveyor units, and conveyor belts which form a bridge between mobile units. In a mobile mining machine, usually the unit behind the cutting machine is referred to as the mobile boot end (MBE) and is used for carrying loads. This unit is mostly driven by crawlers or other tracked or wheeled running gear. The MBE moves in concert with the cutting machine and receives the mined material. There is a conveyor belt connected on one end to the MBE and on the other end to the tunnel section of the continuous haulage system. The mined material which is broken loose from the mineral deposits is transported by the conveyor belt. The conveyor belt is extendible but it is very important that the conveyor belt is straight at all times. This implies that the navigation of the MBE unit and the tunnel must be in perfect synchronization. It is a challenge to maintain synchronization amongst the different crawlers in the same unit, as well as amongst the different crawlers in multiple inter-connected units, especially when the mobile mining machine exhibits non-linear movement.

Most of the presently used MBEs comprise four crawlers which are driven by four different hydraulic motors respectively, and therefore have kinematics which are different from each other. Each of the crawlers is powered by its own hydraulic motor. Also, each of the crawlers is equipped with its own steering cylinder which enables change of direction. In order to move in a straight line, all four of these crawlers must move precisely in the same direction. It is important that these four crawlers are synchronized with respect to steering to follow the same direction. Since the pipe connecting the hydraulic motor and the crawler is of different lengths for the right and the left crawlers, and also for the front and the rear crawler, it becomes difficult to synchronize the direction of all the four crawlers, both for linear and non-linear movements. This difficulty becomes even more pronounced when the crawlers of multiple inter-connected vehicle units are required to move together in synchronized motion especially when moving in curves.

Similar issue arises with regard to maintaining the speed of all the crawlers, especially when the mobile mining machine is moving non-linearly, for example during circular motion. In circular motion, the inner crawler must drive slower than the outer crawler, the difference in the speed being about 20%. The crawler requirements are higher and more versatile in situations where the mobile mining machine comprises multiple inter-connected vehicle units. Some of these requirements are:

achieving the same speed for parallel and series crawlers,
achieving different speeds for parallel crawlers during cornering,
achieving constant speed for all crawlers during uphill and/or downhill tours,
avoiding slippage effect in case of slippery underground situations, and
ensuring safe and failure-free operation even during unplanned movement.

There have been attempts to achieve this control of crawler movement in the past. However, the earlier systems have not been able to achieve perfect coordination in the movement of the crawlers of the interconnected vehicle units in mobile mining machine. Also, there has always been requirement of manual intervention to control the operations of the mobile mining machines in the prior art, which makes the operations slow and prone to error.

Document U.S. Pat. No. 9,616,949 B2 discloses an articulated tracked vehicle having front and rear connected vehicle units which can be steered with the help of control means such that the front and rear vehicle units are individually steerable in a coordinated manner to obtain uniform steering of the vehicle in its entirety. Another prior-art document, U.S. Pat. No. 7,950,478 B2 discloses a heavy capacity transporter having multiple track-axles which is capable of controlling the steering, speed, and suspension of loads by the machine using a controller. However, none of the prior-art documents is capable of automatically setting the input values of the driving parameters like speed, direction, torque, proximity from the tunnel wall etc. Also, the solutions provided in prior art are complex and difficult to put in practice without human intervention.

Accordingly, in order to address the above-mentioned problems in the prior art, there exists a need for a system configured to control the driving parameters of a mobile mining machine, including speed and direction of each of the crawlers with precision to ensure that movement of all the crawlers in all the vehicle units of the machine is synchronized. There is also a requirement to reduce manual intervention in operations of the mobile mining machine, particularly in synchronizing the movements of the crawlers of one or more vehicle units of the machine. It is important that this system is also simple and easy to maintain.

SUMMARY

It is an aim of the present disclosure to provide a system and method for controlling the movement of a mobile mining machine that addresses and aims to solve or at least reduce the problems of the prior-art. These aims are achieved through a system and a method as disclosed herein.

The term "mobile mining machine" in the text is intended to include all types of equipment used for cutting, boring, excavating, drilling, mining, breaking, scraping, crushing and grinding rocks and mineral deposits, both above and under the ground surface. It also includes the equipment used for transportation of the mined material.

The term "synchronization" in the text is intended to mean precise coordination of the driving parameter(s) of different crawlers belonging to one or more vehicle units which may be mechanically linked together to constitute the mobile mining machine, to prevent collisions and ensure smooth and error-free navigation of the whole machine. The driving parameters of the crawlers of the mobile mining machine include speed, direction, torque, proximity, lift and angle.

The term "automated" in the text is intended to mean operated with machine-generated inputs in order to reduce the amount of work done by humans, and to reduce the time taken to do the work.

One object of the present disclosure is to provide a system and method of controlling a mobile mining machine in such a way that the movement of the crawlers of one or more inter-connected vehicle units in the machine is synchronized with regard to one or more driving parameters to ensure safe transit and operation of the machine inside tunnels.

Another object of the present disclosure is to provide a system of controlling a mobile mining machine such that the system is configured to set operating values of driving parameters by taking either manually entered inputs or automated inputs from r systems including navigation systems, camera systems and sensors.

Yet another object of the present disclosure is to provide a system and method of controlling a mobile mining machine which is automated to an extent where it requires very little manual intervention to ensure safe and failure-free operations of the mobile mining machine.

Still another object of the present disclosure is to provide a system and method of controlling a mobile mining machine which is configured to ensure precisely synchronized navigation of the crawlers and which addresses the complex crawler requirements of machines having multiple inter-connected crawler-driven vehicle units.

It is also an object of the present disclosure to provide a reliable and uncomplicated system and method of controlling a mobile mining machine which is easy to operate and maintain.

These and other objects of the disclosure, which will become apparent from the following description, are achieved by means of a system and method of controlling a mobile mining machine which exhibits the features described below.

According to one aspect of the present disclosure, there is provided a system for controlling a mobile mining machine, said machine comprising a first vehicle unit having at least one pair of parallelly arranged right and left crawlers driven by their respective motors, which are preferably hydraulic motors. The system for controlling the machine comprises an input means for setting an operating value for at least one driving parameter for each of the parallelly arranged right and left crawlers, at least one sensor for measuring an actual value of the driving parameter for each of the parallelly arranged right and left crawlers and a regulating means for regulating the respective crawler motor in response to a control signal for the respective crawler. The controller is configured to receive said operating value of the driving parameter from the input means (25) and said actual value of the driving parameter from the at least one sensor (55), and generate the control signal for the respective crawler based on said operating value of the driving parameter of the respective crawler and said actual values of the driving parameter of the pair of right and left crawlers comprising the respective crawler. The control signal is preferably in the form of PULSE WIDTH MODULATION [PWM] for each crawler. Preferably, the system includes a separate regulating means for each crawler. Preferably, the regulating means are hydraulic valves which open and close in response to the signal from the controller.

The input means for the system may be a manual input means like a joystick on a pendant control or it may be an automation system with automated input means like a navigation system (GPS) operating above the ground, or a high-level camera system or any sensors from under the ground. Any of these input means are used for setting the operating value of the driving parameter for the system. Driving parameters include speed, direction, proximity from the tunnel wall, lift, angle, torque, position of the crawlers on the path, etc. The operating value for the driving parameter is set based on at least one parameter selected from the parameters including a target value of the driving parameter of the respective crawler, a distance of the respective crawler to a wall, a position of the respective crawler on a path, and a center of rotation of the respective crawler.

Preferably, the operating value for the driving parameter is set based on a target value of the driving parameter of the respective crawler, and a distance of the respective crawler to a wall, optionally together with the center of rotation of the respective crawler. In another embodiment, the operating value for the driving parameter is set based on a target value of the driving parameter of the respective crawler, and a position of the respective crawler on a path, optionally together with the center of rotation of the respective crawler.

As a result of using this system, the movement of the crawlers of the first vehicle unit of the mobile mining machine remains synchronized. This is achieved when the controller compares the actual value of the driving parameter received from the sensor, with the operating value which was set by the input means. This set operating value is time-dependent. If the actual value received from sensor is different from the set operating value, the controller generates a control signal which reaches the regulating means, which in turn regulates the crawler motors to adjust the movement of the crawlers. Advantageously, this system ensures that the movement of all the crawler motors of the first vehicle unit of the mobile mining machine is in synchronization for both linear and non-linear paths.

According to another aspect of the disclosure, there is provided a second vehicle unit articulated in series with the first vehicle units, wherein the second vehicle unit has at least one pair of parallelly arranged right and left crawlers driven by respective crawler motors and the second articulated vehicle units are preferably coupled to the first vehicle unit by a joint and at least one steering cylinder spaced-apart from the joint. The operating value for the driving parameter is set based on a target value of the driving parameter of the respective crawler, and/or a distance of the respective crawler to a wall, and/or a position of the respective crawler on a path, and/or a center of rotation of the respective crawler, and/or a relative orientation of the articulated vehicle units. Preferably the regulating means is configured to regulate the pressurizing of the steering cylinders in response to a control signal from the controller. The operating value may be set as time dependent.

The input means may be selected from the group consisting of joystick on pendant control, automated navigation systems, sensors positioned under the ground and camera systems. On the basis of the comparison between the actual values obtained from the sensor and the set operating values, the controller generates a signal which reaches the regulating means, which in turn regulates the movement of the crawlers. This regulation may be achieved by modifying the pressure in the steering cylinders or by modifying the speed of the crawler motor.

The system disclosed in the present disclosure may be used for different crawler combinations which commonly exist in the mobile machining units. Preferably, for the combinations described below, the set-up employs hydraulic motors as the crawler motors, which work to drive the crawlers along with hydraulic valves and hydraulic pumps.

One such combination is the two-parallel crawler arrangement, wherein a pair of right and left crawlers are arranged parallel to each other, each of the crawlers having their respective hydraulic motor and hydraulic valve. In an exemplary system, the input means are used to set the operative values of at least one driving parameter for each of the right and the left crawler. The controller receives this input and sends the control signals to the regulating means, which is preferably a hydraulic valve. Each of the hydraulic valves of the right and the left crawler receive the control signal from the controller and drive the respective hydraulic motors. As an example of the drive parameters, the speed of the motors is measured in this system. The speed sensor is present on the hydraulic motor. It is a proximity switch unit which detects the edge of the gear-wheel which is assembled to the hydraulic motor. The counts of passing edges of the revolving gear-wheel per second indicate the speed of the crawler. The controller then compares the set operating value with the actual speed value of the hydraulic motor. Kinematics of the crawler system and the characteristic curve of the valve are implemented by the controller. The control signal generated by the controller, regulates the hydraulic valve by causing it to open or close, thereby regulating the speed of the hydraulic motor.

The at least one sensor is each selected from the group consisting of speed sensors, proximity sensors, direction sensors, lift sensors, angularity sensors and load sensors. And when the at least one sensor includes a speed sensor there may be a proximity switch unit which measures the speed of the crawler by detecting and reporting the counts per second of the passing edges of the revolving gear-wheel assembled to the hydraulic motor.

Optionally, another combination on which the disclosed system works comprises two pairs of parallelly arranged right and left crawlers connected in series in such a way that the center of rotation is situated between the front and rear crawlers. Such crawler arrangement is commonly observed in the MBE part of the mobile mining machine. The input means are used to set the operative values of at least one driving parameter for each of the right and the left crawler. The controller receives this input and sends the control signals to the hydraulic valves. In this case, the signals for opening and closing are sent to five valves, two for the front crawlers, two for the rear crawlers and one for the steering cylinder. There are speed sensors on each of the four crawler motors, i.e. on the right and left front crawlers and on the right and left rear crawlers. Output from each of these sensors is received by the controller. On comparing these sensor output values or the actual values with the set operating values, if the values are found to be different, the controller generates a control signal to regulate the movement of that hydraulic motor, the value of which needs to be adjusted.

Preferably, similarly, the steering cylinder is also regulated by the controller to ensure that the vehicle unit is directionally synchronized. The steering cylinder is regulated by the fifth hydraulic valve in this arrangement. The exact position of the extension of the steering cylinder is very important for precise navigation. The actual extended position of the steering cylinder is detected by the linear proximity system. This system is implemented in the steering cylinder. There is a position sensor on the steering cylinder, the output of which is also received by the controller. This value is compared with the set operating value for the direction, and the difference is adjusted by the control signal generated by the controller to open or close the hydraulic valve of the steering cylinder. In this combination, all the hydraulic motors are individually controllable.

Yet another possible crawler combination comprises two pairs of parallel crawlers arranged in series in such a way that the centers of rotation lie on each of the front and rear pair of parallelly arranged crawlers. Such crawler arrangement is commonly observed in the tunnel section of the mobile mining machine. The operating values for speed and direction are set and provided to the controller using input means. The controller generates control signals and sends them to the six different hydraulic valves, for actuating the front right crawler motor, the front left crawler motor, the rear right crawler motor, the rear left crawler motor, the front steering cylinder and the rear steering cylinder respectively. There are speed sensors positioned on each of the four crawler motors and position sensors on each of the steering cylinders. Output from these sensors is provided to the controller which compares these values with the set operating values. If the sensor output values or the actual values are found to be different from the set operating values, the controller sends control signals to the regulate the hydraulic motor which needs to be readjusted to meet the set operative values. In this combination, all the hydraulic motors are individually controllable.

Advantageously, the control system prevents slippage of the mobile mining machine if the machine is being driven on a slope. Since the speed sensors provide real-time measured speed values to the controller, in case of increased speed on a slope, slippage effect is avoided as the controller sends control signals to the regulating means to correct the speed of the crawler motors.

According to another aspect of the present disclosure, the different sensors that can be used for measuring the driving parameters include speed sensors, position sensors, direction sensors, lift sensors, load sensors, torque sensors, angularity sensors, proximity sensors etc. The at least one sensor is each selected from the group consisting of speed sensors, proximity sensors, direction sensors, lift sensors, angularity sensors and load sensors. Speed sensors may include the kind of sensors which are positioned on the crawler motors, and have a proximity switch unit which is configured to detect and report the counts per second of the passing edges of the revolving gear-wheel which is assembled to the crawler motor, i.e. the speed of the crawler is measured by detecting and reporting the counts per second of the passing edges of the revolving gear-wheel assembled to the hydraulic motor.

Position sensors include ultrasonic sensors and radar sensors. The position sensors help in avoiding collision of the mobile machining unit with the tunnel wall. In addition to these position sensors, there is provision of a laser system which includes a means of producing a laser beam which simulates a navigation line to guide the mobile mining machine especially when the machine is moving on a linear path. The system also includes a laser target which is placed on any vehicle unit of the mobile mining machine. This laser target is capable of detecting the laser beam. During navigation, if the laser beam is not found to be in the middle of the laser target, it implies that the vehicle unit has deviated from its linear path. When this information is provided to the controller, either manually via pendant control or using automated input means, the controller corrects the deviation by causing the direction of the mobile mining machine to change. The laser sensor system which includes a laser source produces laser beam which simulates a navigation line to guide the mobile mining machine. The laser sensor system may include a target for receiving and detecting the produced laser beam.

The driving parameter is selected from the group consisting of speed, direction, proximity, lift, angularity, torque and load.

According to yet another aspect of the present disclosure, there exist multiple linear and non-linear paths in which the first vehicle unit or the inter-connected multiple vehicle units may be maneuvered. In one such maneuver, the rear right and left crawlers remain straight and the front right and left crawlers are steered on one side. Another possible maneuver which may be referred to as "Steering dog-walk" includes both the rear and front pairs of parallel right and left crawlers steered to the same side, at the same angle. Yet another possible maneuver which may be referred to as the "Steering circular walk" includes both the rear and front pairs of parallel right and left crawlers steered to different angles, in a way that is similar to moving in a circle.

According to yet another aspect of the present disclosure, the mobile mining machine which is controlled by the control system described above comprises a vehicle unit having at least one pair of parallelly arranged right and left crawlers driven by respective crawler motors along with other components as described in the control system above.

According to still another aspect of the present disclosure, the method of controlling a mobile mining machine using the system described above, comprises the steps of
- setting an operating value for at least one driving parameter for each of the parallelly arranged right and left crawlers;
- measuring the actual value of the driving parameter for each of the parallelly arranged right and left crawlers; and
- determining a control signal for each crawler and sending the control signal to the regulating means, preferably a hydraulic valve which open or close according to the signal; and
- regulating the respective crawler motor in response to the control signal for the respective crawler; wherein the control signal for the respective crawler is generated based on said operating value of the driving parameter of the respective crawler and said actual values of the driving parameter of the pair of right and left crawlers comprising the respective crawler.

In this method, the step of setting the operating value is performed manually or automatically by an automation system, wherein the operating value of the driving parameter is set based on a target value of the driving parameter of the respective crawler, and/or a distance of the respective crawler to a wall, and/or a position of the respective crawler on a path, and/or a center of rotation of the respective crawler, preferably the method is performed real time.

Other aspects and advantages of the present disclosure will be more apparent from the following description, which is not intended to limit the scope of the present disclosure.

BRIEF DESCRIPTION OF DRAWINGS

A specific implementation of the present invention will now be described, by way of example only, and with reference to the accompanying drawings in which:

FIGS. 5A, 5B and 5C illustrate the different crawler arrangements which are controlled using the control system according to one of the preferred embodiments of the present disclosure. FIG. 5A shows an arrangement where two crawlers are parallel to each other; FIG. 5B shows a four crawler arrangement with two pairs of parallel crawlers in series, where center of rotation is between the front and the rear crawler; and FIG. 5C shows a four crawler arrangement with two pairs of parallel crawlers in series, where center of rotation is situated on each crawler;

FIG. 6A illustrates the situation where the front crawlers are steered and the rear crawler are straight; FIG. 6B illustrates the situation where both front and rear crawlers are steered in the same direction; and FIG. 6C illustrates the situation where both front and rear crawlers are steered in different directions;

FIG. 7A illustrates a situation where there is no deviation in the path of the machine and FIG. 7B illustrates a situation where there has been a deviation in the path of the machine;

FIG. 8 illustrates the use of position sensors to prevent collision of the mining machine with the tunnel wall, according to one of the preferred embodiments;

DETAILED DESCRIPTION

The present disclosure will now be described with reference to the accompanying embodiments which do not limit the scope and ambit of the disclosure. The description provided is purely by way of example and illustration. The examples used herein are intended merely to facilitate an understanding of ways in which the embodiments herein may be practiced. Accordingly, the examples should not be construed as limiting the scope of the embodiments herein.

Figure 1:
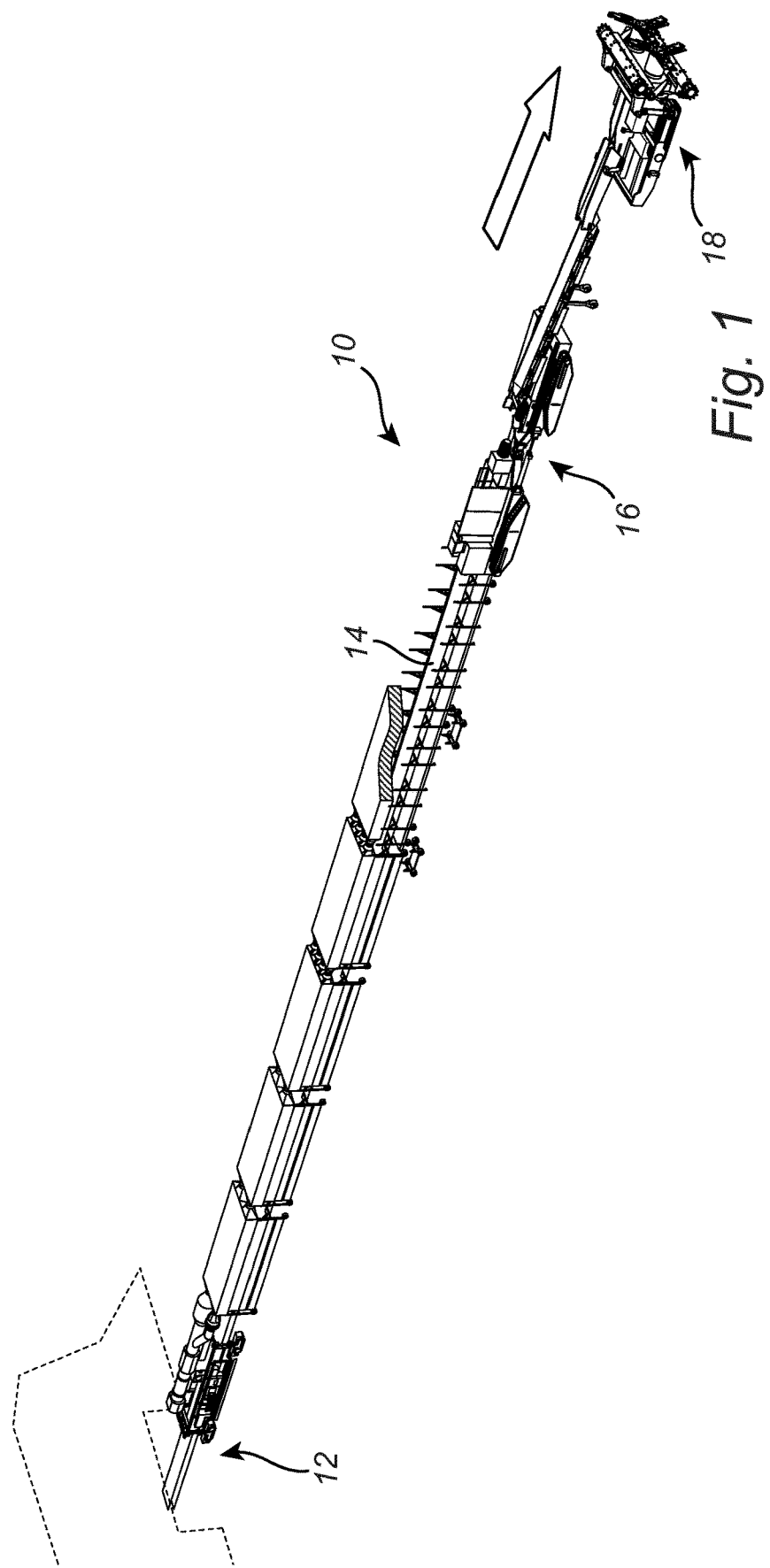
FIG. 1 shows a schematic representation of a mobile mining machine.

FIG. 1 shows a schematic representation of a part of the mobile mining machine (10). The figure shows the parts of the machine which work to haul the mined material away from the mining site. The cutting machine (18) moves in the direction indicated by the arrow in the figure. Cutting machine (18) is followed sequentially by the MBE (16), an extendible conveyor belt (14) and the tunnel section (12). Cutting machine (18) breaks the mineral deposits and this mined material is transported by the conveyor belt (14). It is important that the conveyor belt (14) remains straight at all times during transportation. To ensure that the belt (14) is straight, it is important that the movement of the MBE (16) and the Tunnel section (12) unit of the mobile mining machine (10) is perfectly synchronized.

Figure 2:
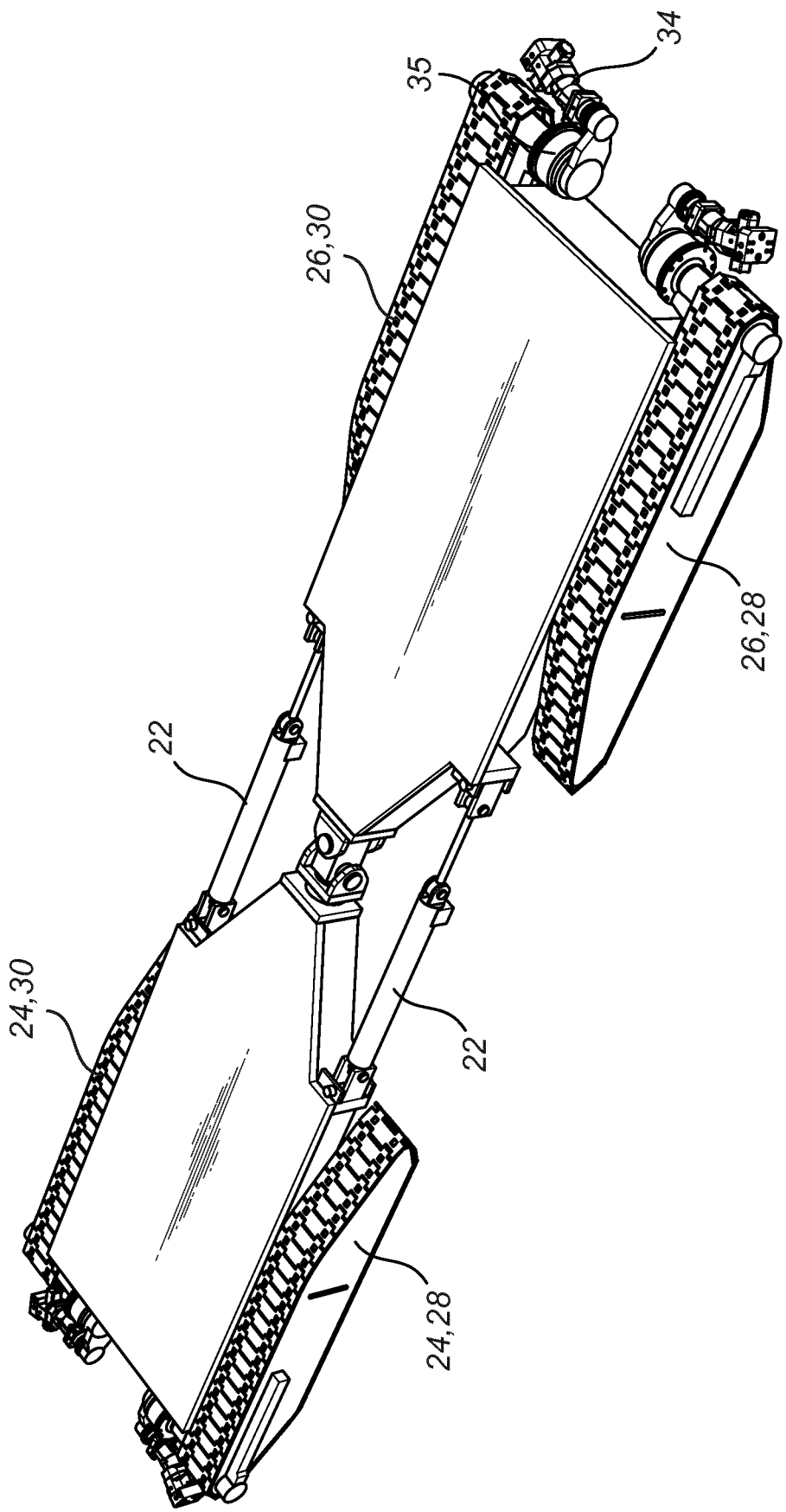
FIG. 2 shows a perspective view of the MBE, the movement of which is controlled by the system according to one of the preferred embodiments of the present disclosure.

Referring to FIG. 2, the MBE (16) is shown as an exemplary vehicle unit of the mobile mining machine (10) which is controlled by the system according to one of the preferred embodiments of the present disclosure. The MBE (16) comprises two pairs of parallelly arranged crawlers, which are addressed as the front right crawler (24, 28), the front left crawler (24, 30), the rear right crawler (26, 28) and the rear left crawler (26, 30). These crawlers are driven by their respective hydraulic motors (34). There is also a gear-wheel (35) shown to be positioned next to the motor (34). The steering cylinders (22) are positioned in between the two pairs of crawlers. The hydraulic motors (34) are governed by the control system according to one of the preferred embodiments to synchronize the movement of all the crawlers of the MBE (16). According to an alternate embodiment, the control system is configured to synchronize the movement of the crawlers of all the inter-connected vehicle units of the mobile mining machine (10).

Figure 3:
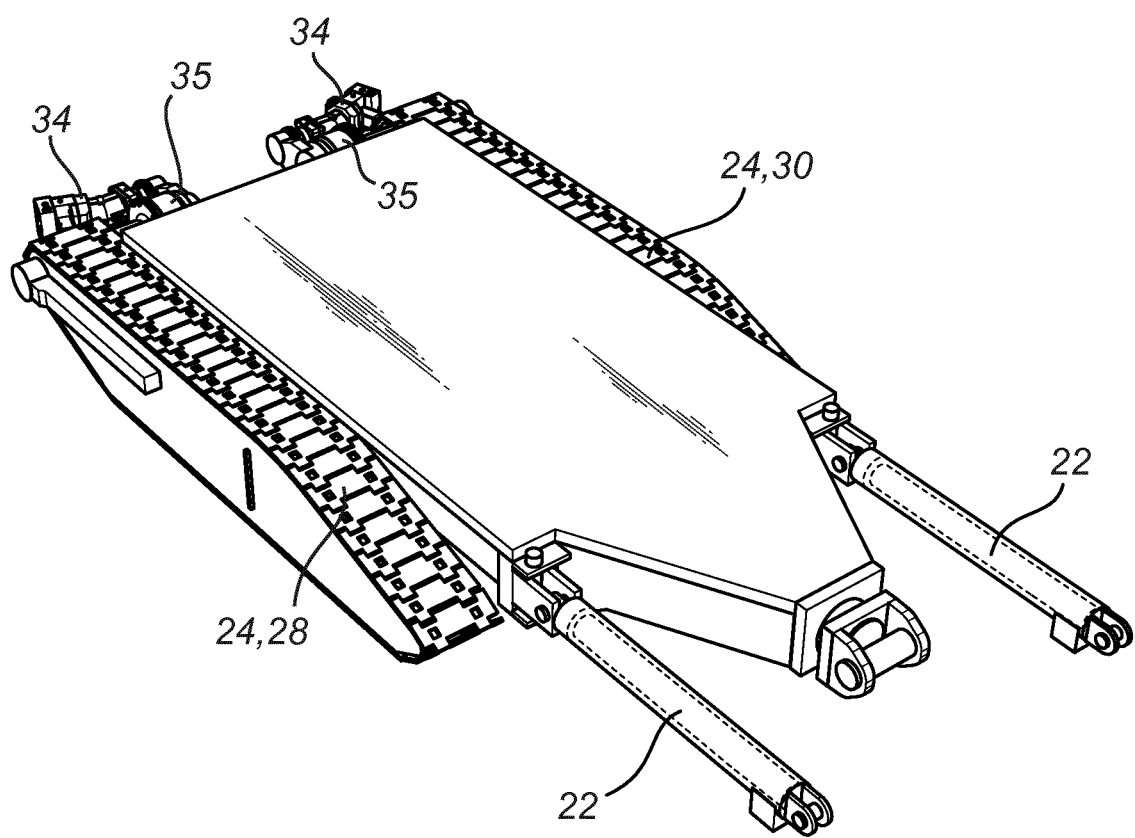
FIG. 3 shows a perspective view of the front half of the MBE unit showing the crawlers and steering cylinders which are controlled by the system according to an embodiment of the present disclosure.
Figure 4A:
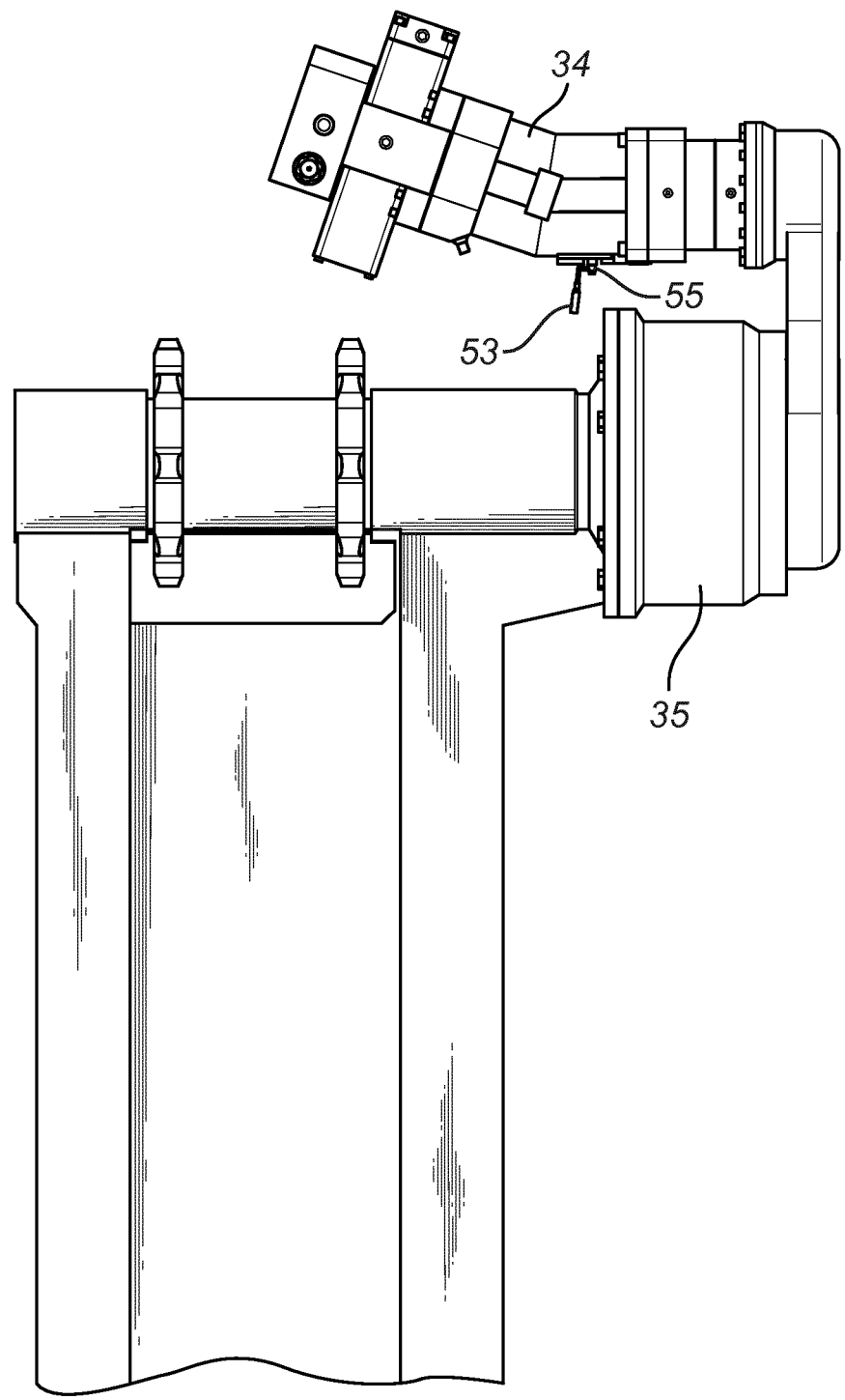
FIGS. 4A and 4B shows side and perspective views of the crawler motor which is controlled by the system according to one of the preferred embodiments of the present disclosure.
Figure 4B:
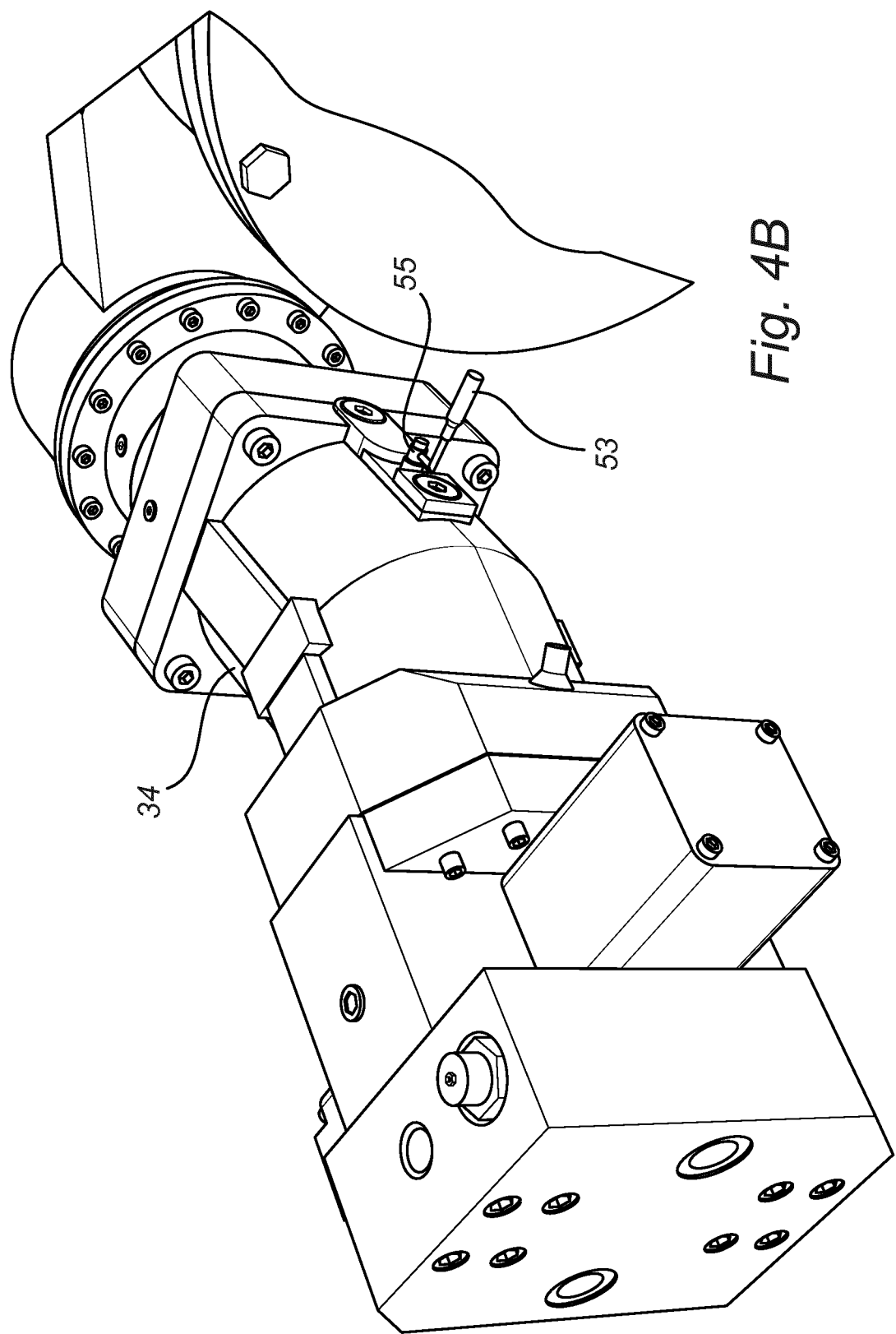

FIG. 3 shows the front half of the MBE (16) where the front right crawler (24, 30) and the front left crawler (24, 28) is clearly visible along with the hydraulic crawler motors (34) and the gear-wheels (35). It is clear from the FIG. 3 that steering cylinders (22) have pivotal linkage components to attach to the rear half of the MBE (16). The motor (34) and the gear-wheel (35) are shown in the FIG. 4A-4B. The sensor (55) is positioned on the motor (34) and the cable component (53) extends outwards from the sensor (55). According to one of the preferred embodiments of the present disclosure, the sensor (55) mentioned above is a speed sensor which is a proximity switch unit capable of detecting the edge of the gearwheel (35) which is assembled to the hydraulic motor (34). The speed sensor (55) together with the cable component (53) measures the speed of the motor (34) by counting the passing edges per second of the revolving gear-wheel (35). This measure is then provided to the controller for causing readjustments in the movement of the crawlers.

Figure 5B:
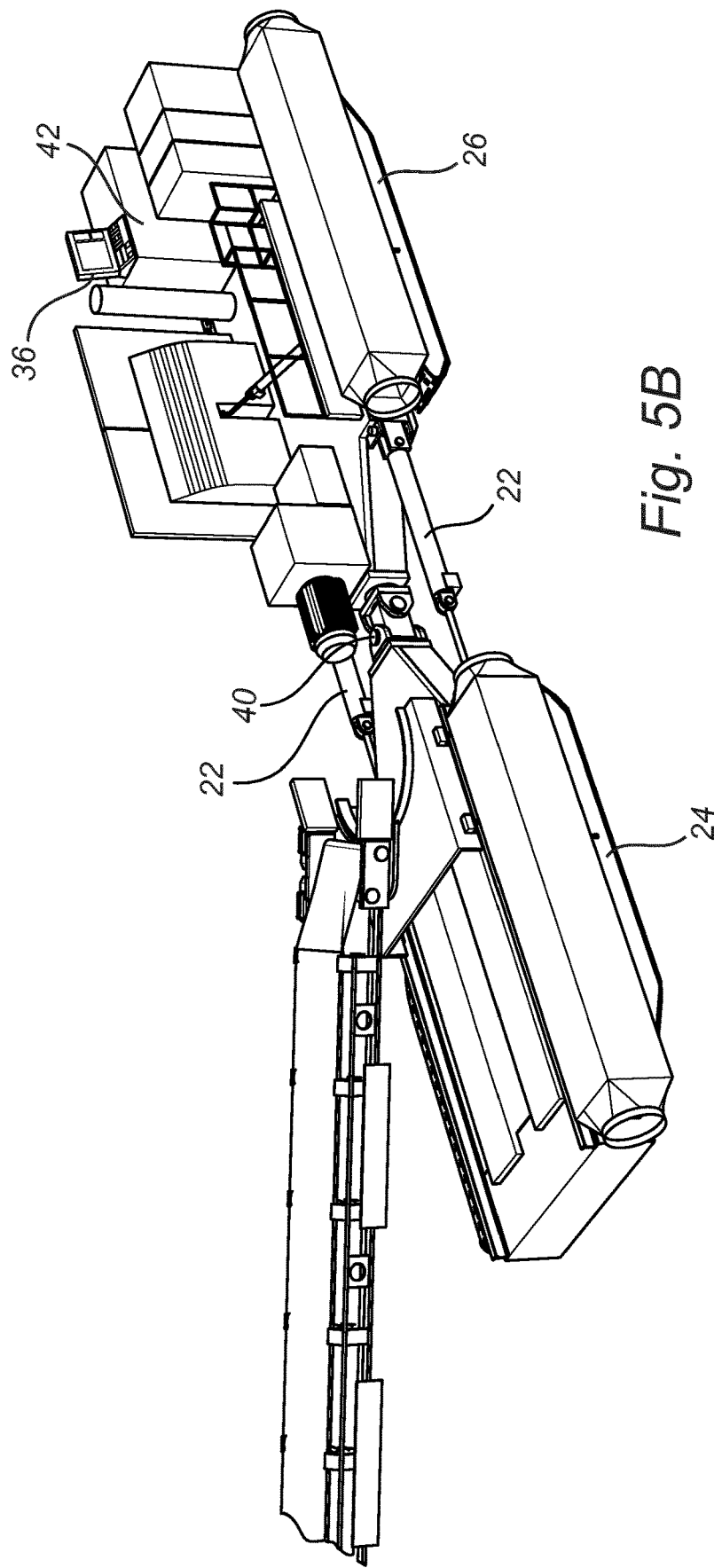
Figure 5C:
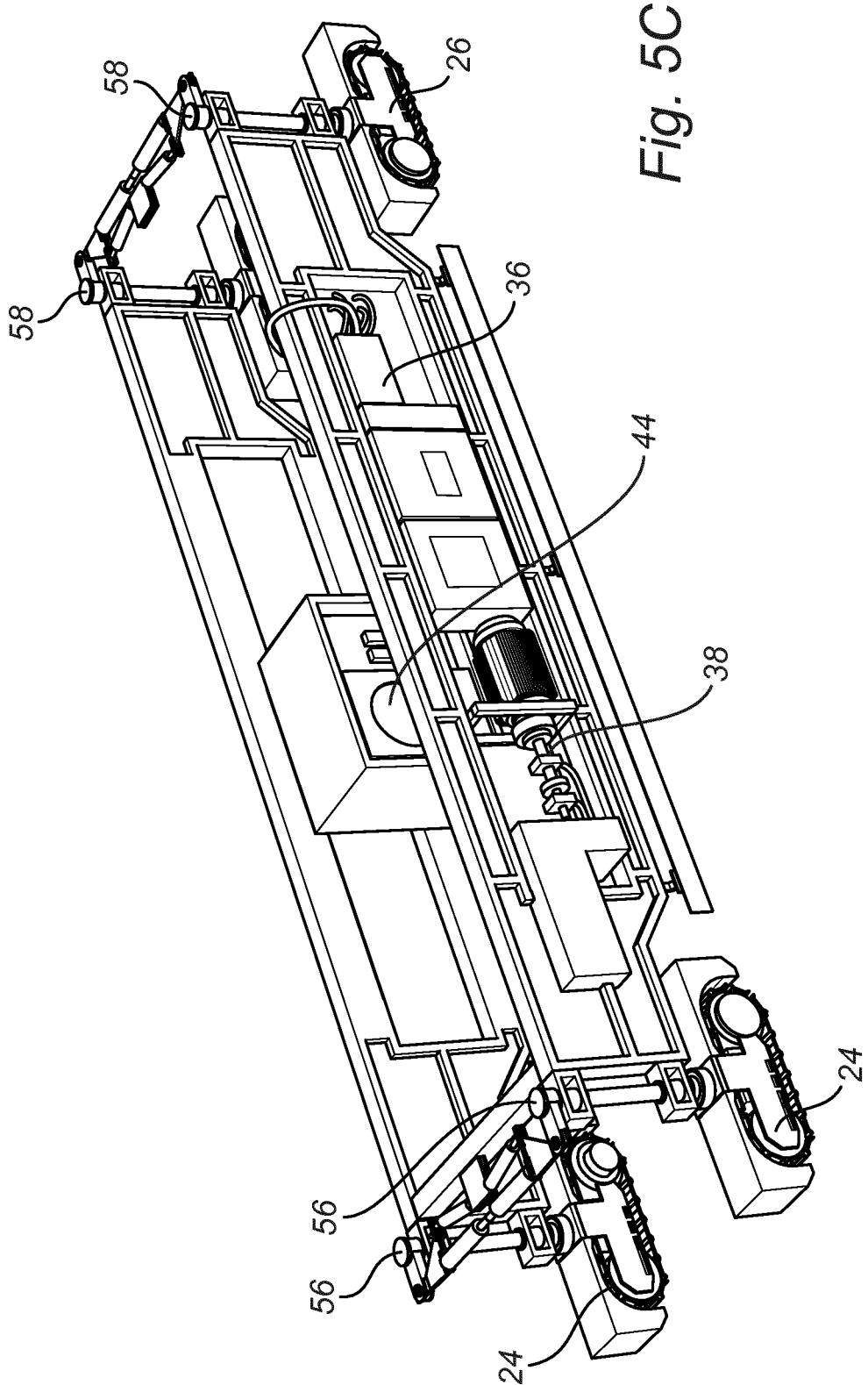

According to one of the preferred embodiments of the present disclosure, the system for controlling the movement of the mobile mining machine (10) is used for different crawler combinations employed by the vehicle units of the mobile mining machine (10) as illustrated in FIG. 5A-5C. As illustrated in FIG. 5A, the vehicle unit comprises a two-parallel crawler arrangement. The electric box (36) houses the controller which is responsible for controlling the movement of the mobile mining machine (10) according to the system described in the present disclosure. The hydraulic system (38) consists of the hydraulic valves and the hydraulic pump which is not seen in the figure. The vehicle unit is driven by the two parallelly arranged right and left crawlers (28, 30) each powered by hydraulic motors (not shown). Each of the parallelly arranged crawlers have their respective hydraulic system (38).

Figure 9:
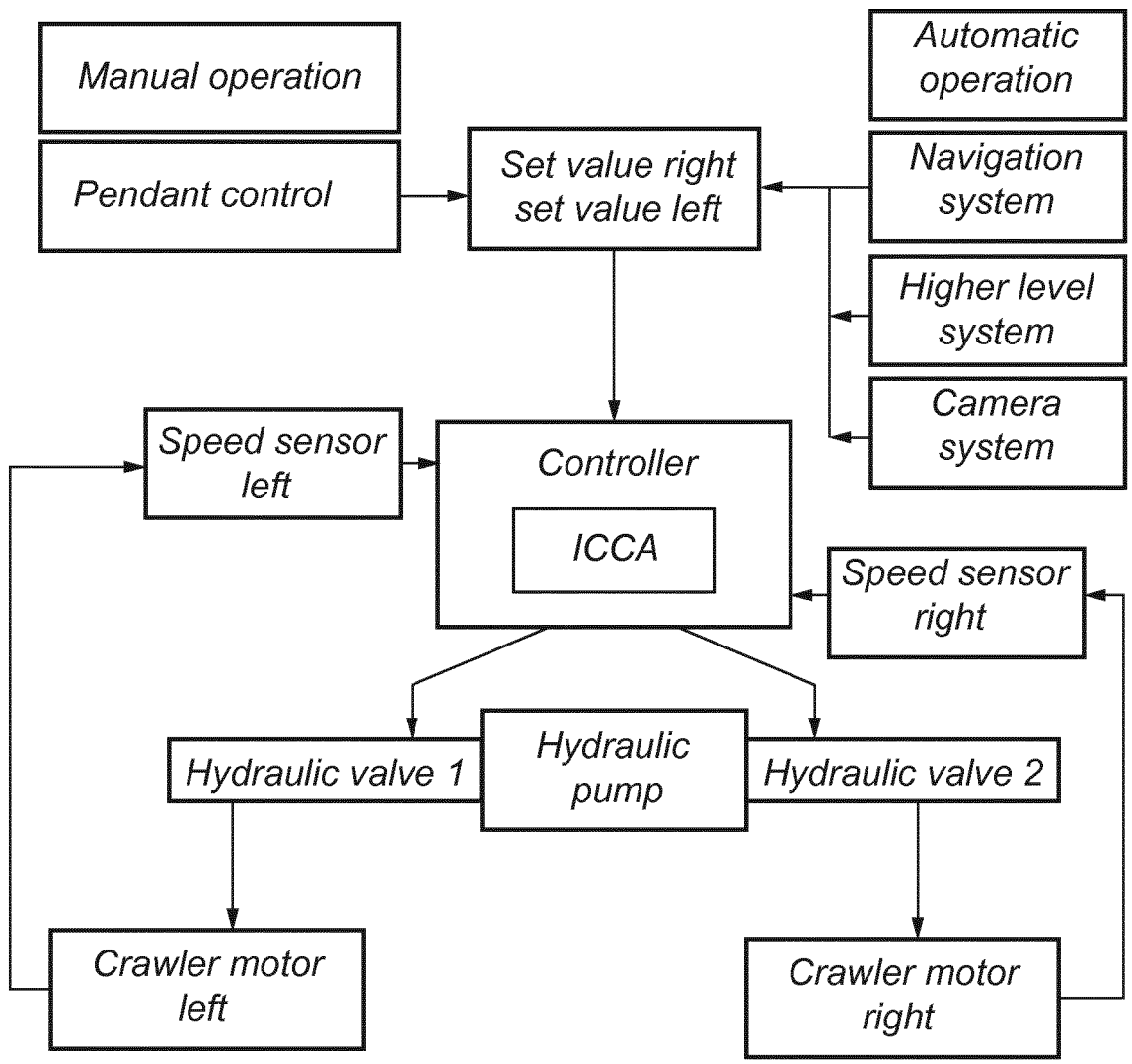
FIG. 9 is a control schematic for the system controlling the movements of the mobile mining machine when there are two crawler assemblies arranged parallel to one another according to one of the preferred embodiments of the present disclosure.

Referring to FIG. 5A and FIG. 9, the working of the system for controlling the crawler movement for this kind of arrangement is explained. In this illustrated embodiment, the driving parameter is chosen as the speed of a crawler. The operating value of the speed is set for each of the left and the right crawlers (28, 30) using an input means (25) which may be manually operated (for example joystick on pendant control) or automatically provided from navigation systems above ground, or higher level camera assembly or any other input device. The operating value of the speed may be time-dependent or a function of time. It may also depend on the structural configuration of the vehicle unit. The operating value of the speed of one crawler may be correlated with that of another crawler in a manner that is dependent on how the crawlers are coupled to the frame of the vehicle unit. In FIG. 5A the left and right crawlers (28, 30) are rigidly coupled to the machine frame via a respective undercarriage frame while, according to FIG. 5C, the left and right crawlers (28, 30) are pivotably coupled to the machine frame about a vertical axis. Further, there are sensors (55) positioned on the motors (34) to measure the real-time speed with respect to each crawler. These measured values are provided to the controller On the basis of the available values as illustrated above, the controller determines for each crawler a respective control signal. In particular, the control signal to the left crawler (30) is determined based on the operating value of speed of the left crawler (30), as well as the measured real-time speed of both left and right crawlers (30, 28), wherein the controller compares the measured actual value with the set operating value to examine whether there is found any difference, or whether the difference exceeds a threshold value Depending on the result of the comparison, a control signal is generated, taking the measured real-time speed of the counter-part crawler (the other crawler of the identical crawler pair) into account Such signal is directed to readjust or modify the speed for the crawler, alternatively to maintain the speed. The comparison and the control signal generation are performed real-time. For example, the controller may be in the form of a proportional-integral (PI) controller which receives the operating value and the measured actual value as input, and after processing, sends a control signal in the form of a PULSE WIDTH MODULATION [PWM] directed to increase or decrease the oil supply to the crawler motor.

This control signal is then communicated real-time to the respective regulating means (38) associated with the left crawler (30). The regulating means (38) is a hydraulic circuit that may include a plurality of valves which opens or closes in response to the control signals and subsequently regulate the pressurization of the crawler motor (34).

Similarly, the control signal to the right crawler is determined based on the operating value of speed of the right crawler (28), and the measured speed of both left and right crawlers (28, 30) This control signal is communicated real-time to the respective regulating means (38) associated with the right crawler (28).

The following example describes how the operating value for a driving parameter is set:

In a situation where a mobile mining machine (10) is required to navigate in a straight line, there may occur some directional deviation from the intended linear path. In order to compensate for the deviation, the control system sets a suitable operating value for the speed with respect to the subsequent time-stamp for each crawler. For example, the speed of the left crawler (30) is set as a percentage (e.g. 80%) of the speed of the right crawler (28), depending on the intended target speed of the machine (10), and a distance of the left crawler (30) to the tunnel wall (52).

In yet another exemplary situation, the mobile mining machine (10) is required to move along a curve towards the entrance of a tunnel, when the conveyor belt (14) has not been unrolled and extended on the machine (10). If there occurs a deviation of the running machine (10) from its intended path, the control system corrects it by setting the individual speed for each crawler at the subsequent time-stamp. Said individual speed for the left crawler (30) is depended on the intended target speed of the machine (10), the position of the left crawler (30) on the path, and the center of rotation of the left crawler (30). Similarly, the individual speed for the right crawler (28) is set based on the intended target speed of the machine, the position of the right crawler (28) on the path, and a center of rotation of the right crawler (28).

Figure 10:
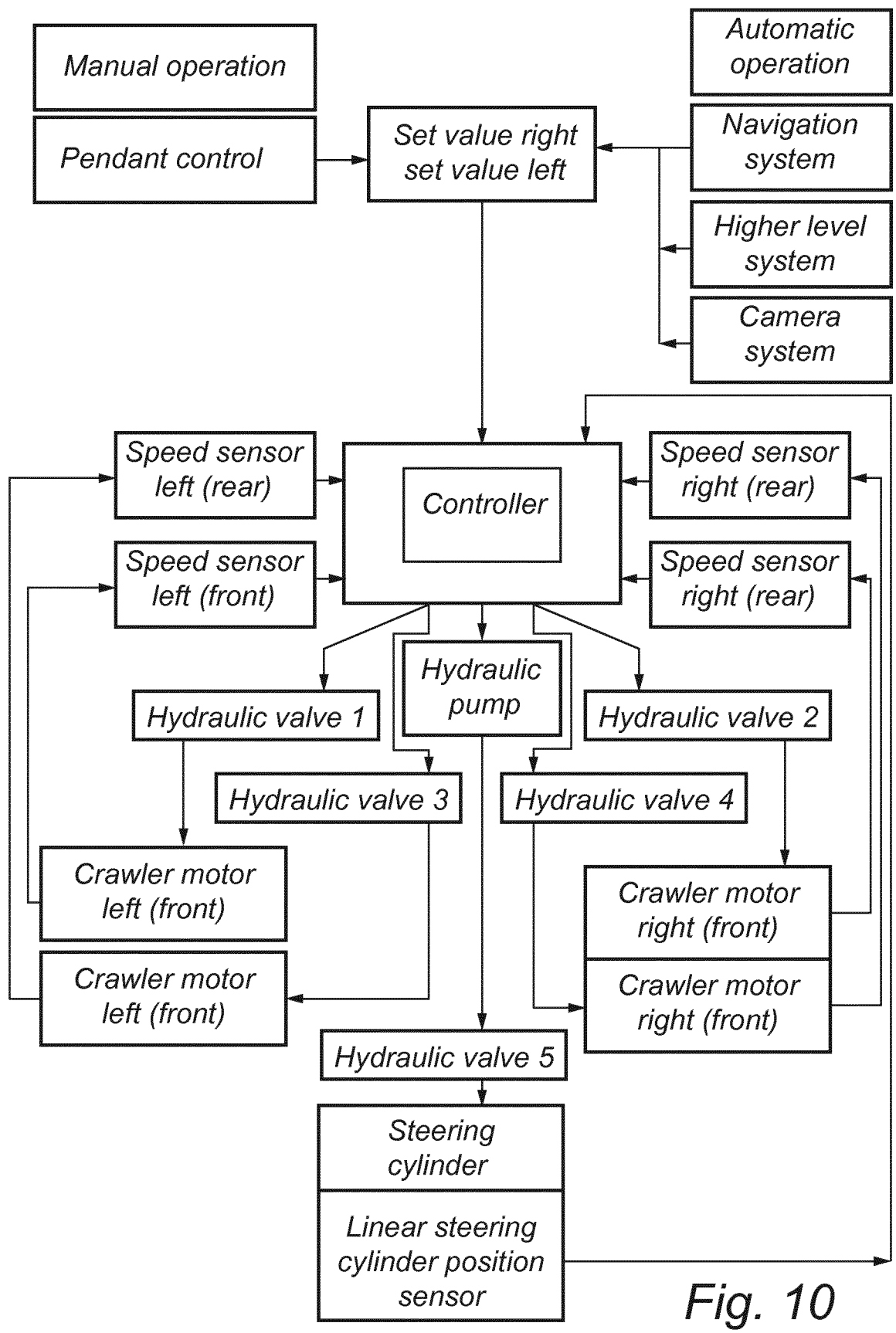
FIG. 10 is a control schematic for the system controlling the movements of the mobile mining machine when there are two pairs of parallel front and rear crawler assemblies arranged in series such that the center of rotation of the machine lies between the two pairs of parallel front and rear crawler assemblies, according to one of the preferred embodiments of the present disclosure.

Referring to FIG. 5B, another alternate embodiment of the present disclosure is explained. This arrangement comprises two pairs of parallelly arranged right and left crawlers connected in series in such a way that the center of rotation (40) is situated between the front (24) and rear crawlers (26). Such crawler arrangement is commonly observed in the MBE (16) part of the mobile mining machine (10). Also shown in the figure are the position of the operator (42) and the electric box (36) for housing the controller. The working of the system for controlling movement of the crawler motors for this kind of crawler arrangement is explained in FIG. 10. Accordingly, the input means (25) (which may be manually operated, for example joystick on pendant control or automatically from navigation systems above ground, or higher level camera assembly or any other input device) are used to set the operative values of at least one driving parameter for each of the four crawlers (24, 26). The controller receives this input and sends the control signals to the hydraulic valves. In this case, the signals for opening and closing are sent to five valves, two for the front crawlers (24), two for the rear crawlers (26) and one for the steering cylinder (22, 40). There are speed sensors (55) on each of the four crawler motors, i.e. on the right and left front crawlers (24) and on the right and left rear crawlers (26). Output from each of these sensors is received by the controller. On comparing these sensor output values or the actual values with the set operating values, if the values are found to be different, the controller generates a control signal to regulate the movement of that hydraulic crawler motor (34), the value of which needs to be adjusted. The steering cylinder (22) at the center of rotation (40) is also regulated by the controller to achieve directional synchronization of the vehicle unit of the mobile mining machine (10). The steering cylinder (22) is regulated by the fifth hydraulic valve in this arrangement. There is a position sensor (not shown) on the steering cylinder (22) which is addressed here as the linear proximity system. It is useful in measuring the exact extension of the piston of the steering cylinder (22) for precise navigation. The output from this linear proximity system is received by the controller. This value is compared with the set operating value for the direction, and the difference is adjusted by the control signal generated by the controller to open or close the hydraulic valve of the steering cylinder (22).

Figure 11:
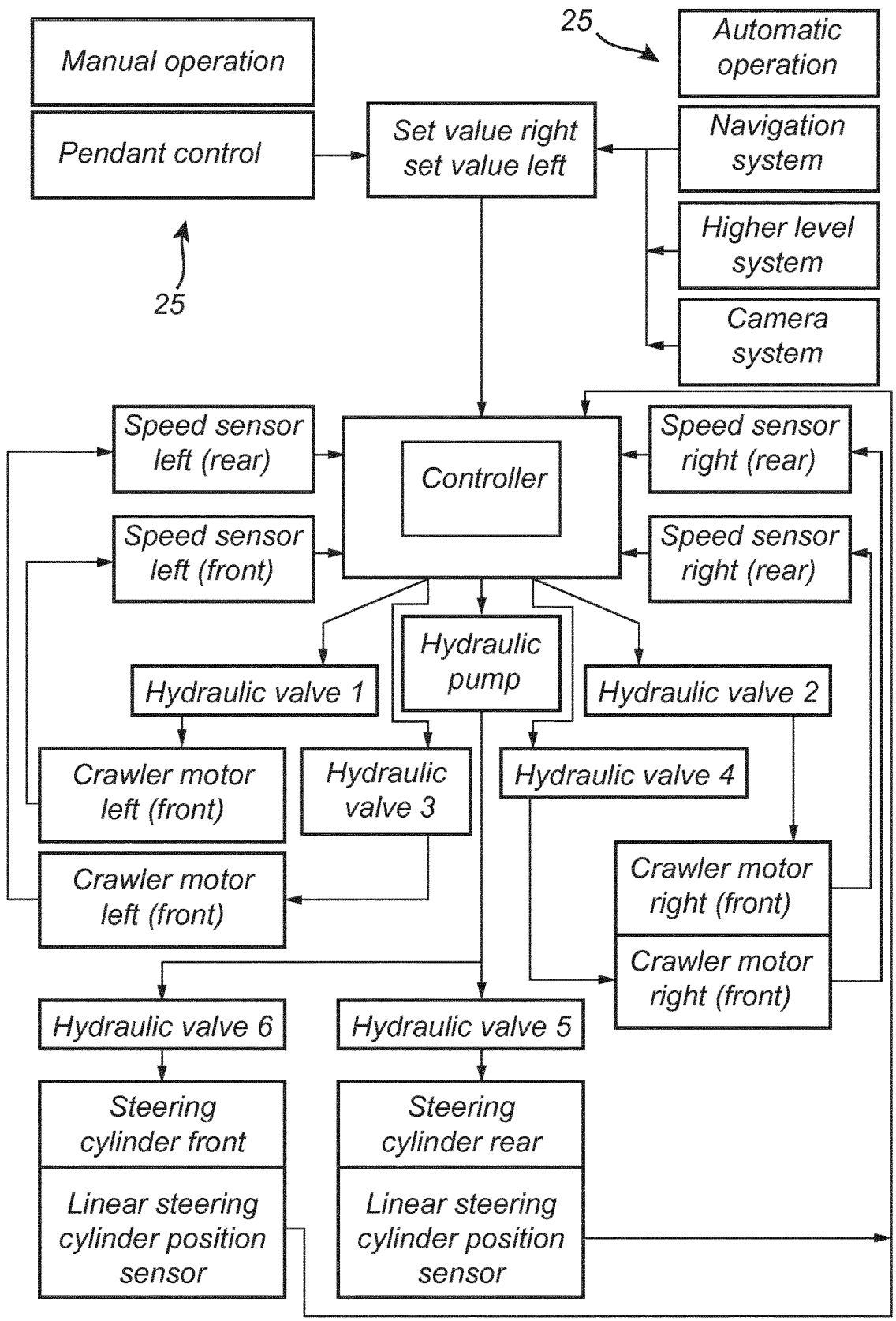
FIG. 11 is a control schematic for the system controlling the movements of the mobile mining machine when there are two pairs of parallel front and rear crawler assemblies arranged in series such that the center of rotation is situated on each of the front and rear crawler assemblies, according to one of the preferred embodiments of the present disclosure.

According to yet another alternate embodiment of the present disclosure, FIG. 5C illustrates a crawler combination comprising two pairs of parallel crawlers (24, 26) arranged in series in such a way that the centers of rotation (56, 58) lie on each of the front and rear pair of parallelly arranged crawlers (24, 26). Such crawler arrangement is commonly observed in the tunnel section (12) of the mobile mining machine (10). Also seen in the figure are the compressor (44), the electric box (36) for housing the controller and the hydraulic system (38). Referring to FIG. 11, the working of the system is explained for the crawler combination shown in FIG. 5C. Accordingly, the input means (25) (which may be manually operated, for example joystick on pendant control or automatically from navigation systems above ground, or higher level camera assembly or any other input device) are used to set the operating values for the driving parameters (speed and direction in this example). These values are provided to the controller which then generates control signals and sends them to the six different hydraulic valves, for actuating all the crawler motors (34) and the steering cylinder (22) respectively. Sensors (55) positioned on the crawler motors (34) and on the steering cylinders (22) send the actual values of speed and direction respectively to the controller which compares them with the set operating values. If the sensor output values or the actual values are found to be different from the set operating values, the controller sends control signals to the regulate the hydraulic motor which needs to be readjusted to meet the set operative values. In this combination, all the hydraulic motors are individually controllable.

Figure 6A:
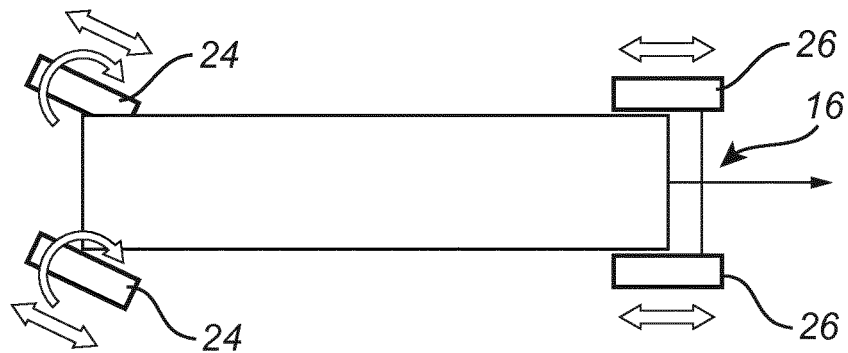
FIGS. 6A, 6B and 6C illustrate the different maneuvers of the MBE which are controlled using the system according to one of the embodiments of the present disclosure.
Figure 6B:
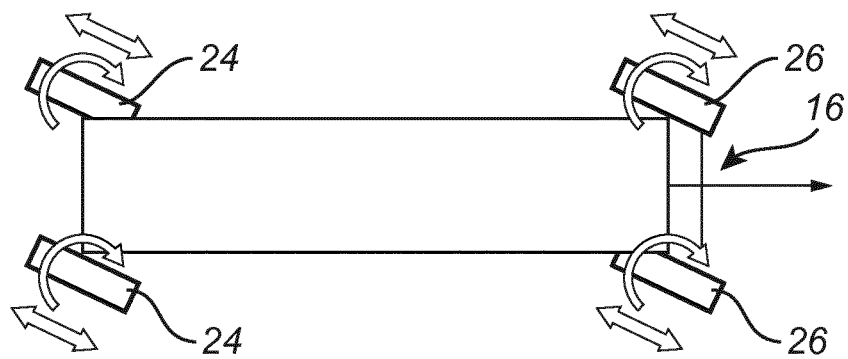
Figure 6C:
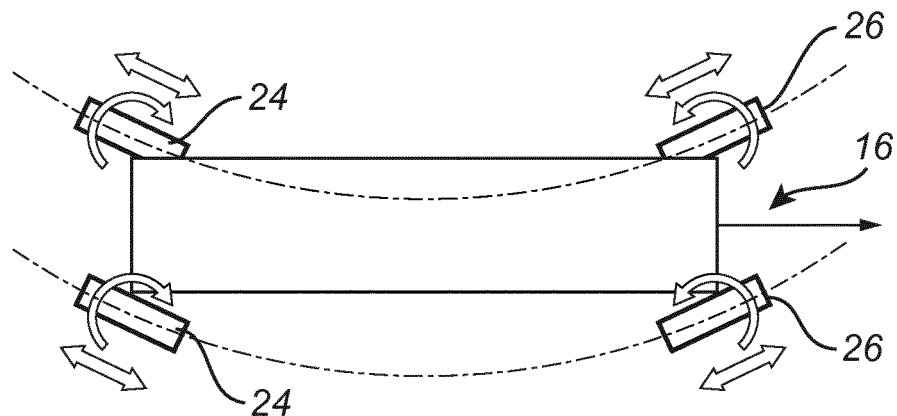

Referring to FIG. 6A-6C, three exemplary manoeuvres by the MBE (16) are illustrated. In FIG. 6A, the front crawlers (24) are steered while the rear crawlers (26) remain straight. Another manoeuvre shown in FIG. 6B, addressed here as the "dog-walk" includes both the rear (26) and front (24) pairs of parallel right and left crawlers steered to the same side, at the same angle. FIG. 6C illustrates the "circular walk" in which the MBE is steered to follow a circular path, which involves both the rear (26) and front (24) pairs of parallel right and left crawlers steered to different angles, in a way that is similar to moving in a circle.

Figure 7A:
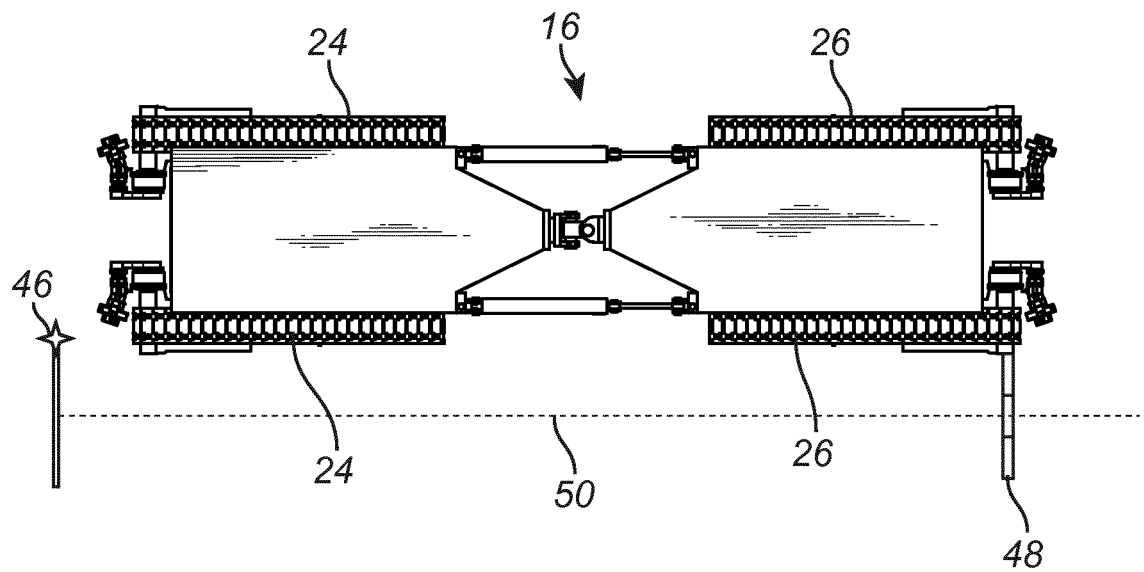
FIGS. 7A and 7B show a laser system guided by a laser sensor, for the mobile mining machine, according to one of the preferred embodiments of the present disclosure.
Figure 7B:
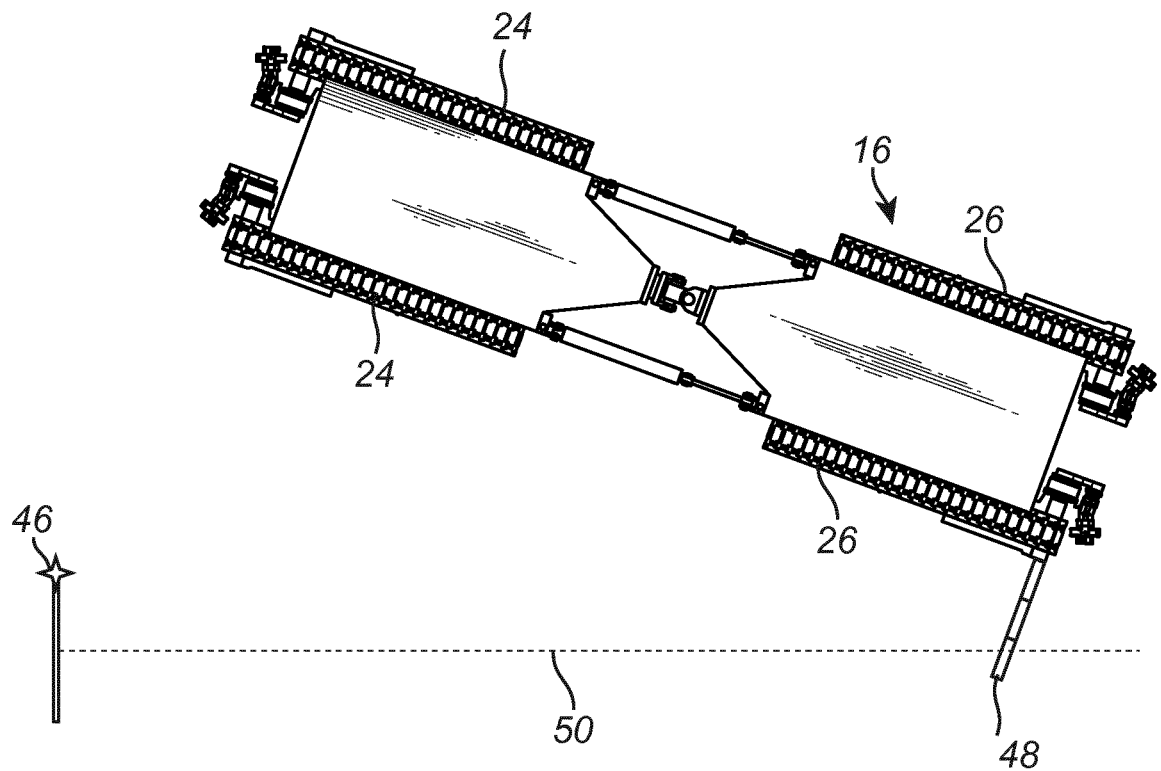

According to one of the preferred embodiments of the present disclosure, one or more vehicle units of the mobile mining machine (10) can be controlled by the system described above to ensure that the machine (10) navigates without any deviation while following a linear path. This is achieved with the help of a laser system as illustrated in FIG. 7A-7B. The vehicle unit shown in the figures is MBE (16) having two pairs of parallelly arranged crawlers connected in series (24, 26). A laser source (46) produces laser beam (50) which simulates a navigation line serving as a guide for the MBE (16). The laser target (48) is positioned on the MBE (16) in such a way that it is capable of detecting the laser beam (50). If the laser beam (50) is detected in the middle of the laser target (48), it implies that the MBE (16) is moving linearly and not deviating from the navigation line. If the laser beam (50) is not detected in the middle of the laser target (48), MBE (16) is considered deviated from the linear path, as shown in FIG. 7B. When such a deviation is detected, the system corrects it by providing the information on the position of the laser beam (50) on the laser target (48), to the controller either manually via pendant control or using automated input means. The controller then sends control signals to correct the direction of the MBE to follow the linear path.

According to another preferred embodiment of the present disclosure, proximity from the tunnel wall (52) can be measured with the help of position sensors (54) as illustrated in FIG. 8. The MBE (16) has on each of its front and rear crawlers (24, 26), a position sensor (54). This position sensor (54) may be a radar sensor or an ultrasonic sensor. The detection area (57) for the position sensor (54) is between the tunnel wall (52) and the MBE (16). These position sensors (54) help in avoiding collision between the MBE (16) and the tunnel wall (52).

Figure 12:
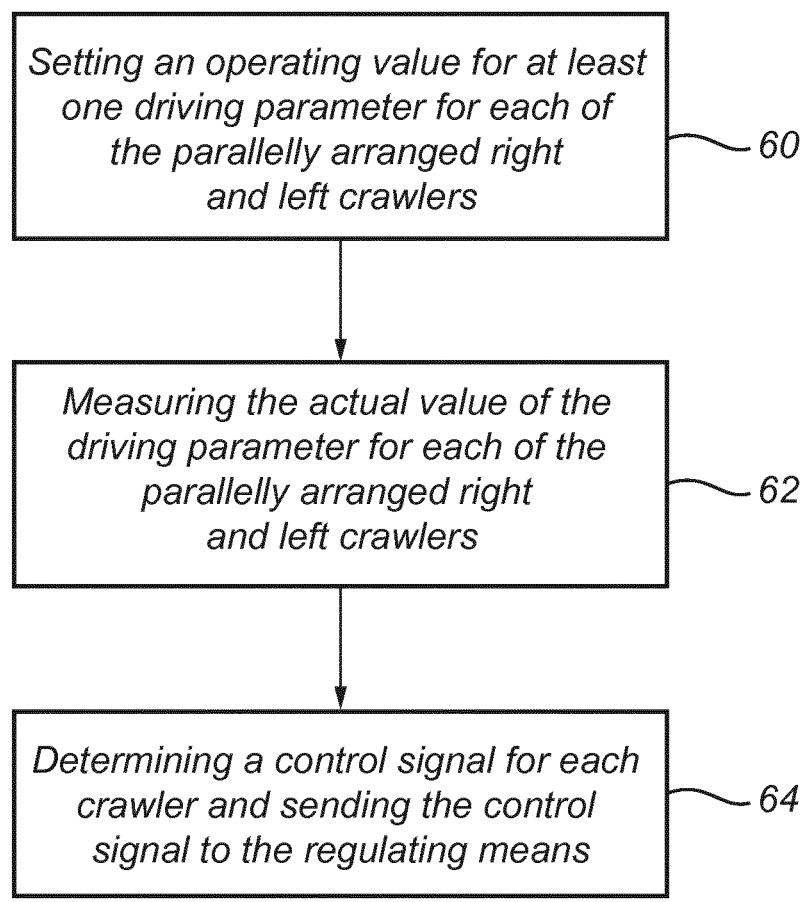
FIG. 12 is a flow-chart depicting an exemplary disclosed method that can be performed by the control system for controlling the movements of the mobile mining machine according to one of the preferred embodiments of the present disclosure.

Flow-chart illustrating diagrammatically, the method sequence (60-64) for the system to control the movement of the vehicle units of the mobile mining machine (10) is presented in FIG. 12. The steps of the method are as follows:

step 60 is setting an operating value for a driving parameter for each of the parallelly arranged right and left crawlers;

step 62 is measuring the actual value of the driving parameter for each of the parallelly arranged right and left crawlers; and step 64 is determining a control signal for each crawler and sending the control signal to the regulating means, preferably a hydraulic valve which opens or closes according to the signal and adjusts the movement of the hydraulic motor driven crawler, thereby regulating the crawler motor in response to the control signal.

Although a few embodiments of the present invention have been shown and described, it would be appreciated by those skilled in the art that changes may be made in these embodiments without departing from the principles and spirit of the disclosure, the scope of which is defined in the claims and their equivalents.

The invention claimed is:

1. A system for controlling a mobile mining machine, said machine including at least one first vehicle unit having at least one pair of parallelly arranged right and left crawlers driven by respective crawler motors, said system comprising:
an input means arranged for setting an operating value for at least one driving parameter for each of the parallelly arranged right and left crawlers;
at least one sensor arranged for measuring an actual value of the at least one driving parameter for each of the parallelly arranged right and left crawlers; and
a controller arranged for determining a control signal for each right and left crawler and sending the control signal to a regulating means to adjust the movement of the mobile mining machine, wherein the regulating means is arranged for regulating the respective crawler motor in response to the control signal for the respective crawler, and wherein the controller is configured to receive said operating value of the driving parameter from the input means and said actual value of the driving parameter from the at least one sensor, to generate the control signal for the respective crawler based on said operating value of the driving parameter of the respective crawler and said actual values of the driving parameter of the pair of right and left crawlers comprising the respective crawler.

2. The system as claimed in claim 1, wherein the input means is a manual system, or an automation system, wherein the operating value for the driving parameter is set based on at least one parameter selected from the parameters including a target value of the driving parameter of the respective crawler, a distance of the respective crawler to a wall, a position of the respective crawler on a path, and a center of rotation of the respective crawler.

3. The system as claimed in claim 1, wherein the mobile mining machine includes a second vehicle unit articulated in series with the at least one first vehicle unit, the second vehicle unit having at least one pair of parallelly arranged right and left crawlers driven by respective crawler motors, the second articulated vehicle unit being coupled to the at least one first vehicle unit by a joint and at least one steering cylinder spaced-apart from the joint, wherein the operating value for the driving parameter is set based on a target value of the driving parameter of the respective crawler, and/or a distance of the respective crawler to a wall, and/or a position of the respective crawler on a path, and/or a center of rotation of the respective crawler, and/or a relative orientation of the articulated vehicle units, and wherein the regulating means is configured to regulate the pressurizing of the steering cylinders in response to a control signal from the controller.

4. The system as claimed in claim 1, wherein the operating value is set as time dependent.

5. The system as claimed in claim 1, wherein the input means is selected from the group consisting of a joystick on pendant control, automated navigation systems, sensors positioned under the ground and camera systems.

6. The system claimed in claim 1, wherein the at least one sensor is each selected from the group consisting of speed sensors, proximity sensors, direction sensors, lift sensors, angularity sensors and load sensors.

7. The system claimed in claim 1, wherein the driving parameter is selected from the group consisting of speed, direction, proximity, lift, angularity, torque and load.

8. The system claimed in claim 1, wherein the at least one sensor including a speed sensor having a proximity switch unit arranged to measure a speed of the crawler by detecting and reporting counts per second of passing edges of the revolving gear-wheel assembled to the hydraulic motor.

9. The system claimed in claim 1, further comprising a laser sensor system including a laser source, which produces laser beam that simulates a navigation line arranged to guide the mobile mining machine.

10. The system claimed in claim 7, wherein the laser sensor system includes a target for receiving and detecting the produced laser beam.

11. The system claimed in claim 1, wherein the control signal sent by the controller is in a form of a pulse-wave module.

12. The system claimed in claim 1, wherein the regulating means include hydraulic valves, which are arranged to be opened and closed in response to the control signals from the controller.

13. A mobile mining machine or a mobile machine for material haulage comprising:
a vehicle unit having at least one pair of parallelly arranged right and left crawlers driven by respective crawler motors; and
a system arranged for controlling the mobile mining machine, the system comprising:
an input means arranged for setting an operating value for at least one driving parameter for each of the parallelly arranged right and left crawlers;
at least one sensor arranged for measuring an actual value of the at least one driving parameter for each of the parallelly arranged right and left crawlers; and
a controller arranged for determining a control signal for each right and left crawler and sending the control signal to a regulating means to adjust the movement of the mobile mining machine, wherein the regulating means is arranged for regulating the respective crawler motor in response to the control signal for the respective crawler, and wherein the controller is configured to receive said operating value of the driving parameter from the input means and said actual value of the driving parameter from the at least one sensor, to generate the control signal for the respective crawler based on said operating value of the driving parameter of the respective crawler and the actual values of the driving parameter of the pair of right and left crawlers including the respective crawler.

14. A method of controlling a mobile mining machine, said machine including a vehicle unit having at least one pair of parallelly arranged right and left crawlers driven by respective crawler motors, said method comprising the steps of:

setting an operating value for at least one driving parameter for each of the parallelly arranged right and left crawlers;

measuring an actual value of the driving parameter for each of the parallelly arranged right and left crawlers;

determining a control signal for each crawler and sending the control signal to a regulating means; and regulating the respective crawler motor in response to the control signal for the respective crawler, wherein the control signal for the respective crawler is generated based on said operating value of the driving parameter of the respective crawler and said actual values of the driving parameter of the pair of right and left crawlers comprising the respective crawler.

15. The method as claimed in claim 14, wherein the step of setting the operating value is performed manually or automatically by an automation system, wherein the operating value of the driving parameter is set based on a target value of the driving parameter of the respective crawler, and/or a distance of the respective crawler to a wall, and/or a position of the respective crawler on a path, and/or a center of rotation of the respective crawler, the method being performed in real time.

* * * * *